(12) United States Patent
Boos et al.

(10) Patent No.: US 11,923,901 B2
(45) Date of Patent: Mar. 5, 2024

(54) ELECTRONIC DEVICES WITH HIGH FREQUENCY WIRELESS COMMUNICATION CAPABILITIES

(71) Applicant: Apple Inc., Cupertino, CA (US)

(72) Inventors: Zdravko Boos, Munich (DE); Bertram R Gunzelmann, Koenigsbrunn (DE)

(73) Assignee: Appli Inc., Cupertino, CA (US)

( * ) Notice: Subject to any disclaimer, the term of this patent is extended or adjusted under 35 U.S.C. 154(b) by 87 days.

(21) Appl. No.: 17/834,695

(22) Filed: Jun. 7, 2022

(65) Prior Publication Data

US 2023/0057449 A1    Feb. 23, 2023

Related U.S. Application Data

(60) Provisional application No. 63/235,423, filed on Aug. 20, 2021.

(51) Int. Cl.
| | | |
|---|---|---|
| H04B 10/112 | (2013.01) | |
| H04B 10/50  | (2013.01) | |
| H04B 10/54  | (2013.01) | |

(52) U.S. Cl.
CPC ......... H04B 10/112 (2013.01); H04B 10/501 (2013.01); H04B 10/541 (2013.01)

(58) Field of Classification Search
None
See application file for complete search history.

(56) References Cited

U.S. PATENT DOCUMENTS

| | | | | |
|---|---|---|---|---|
| 5,687,018 | A  | * 11/1997 | Funaki     | H04B 10/564 |
| | | | | 398/209 |
| 7,425,696 | B2 | * 9/2008  | Kawanishi  | G02F 1/2255 |
| | | | | 398/76 |
| 11,799,553 | B2 | * 10/2023 | Kim       | H04B 10/0797 |
| 2022/0149946 | A1 | * 5/2022  | Ferrari  | H04B 1/38 |
| 2023/0058998 | A1 | * 2/2023  | Gunzelmann | H01Q 3/36 |

OTHER PUBLICATIONS

Wakatsuki et al., Development of Terahertz-wave Photomixer Module Using a Uni-traveling-carrier Photodiode, (Year: 2012).*

(Continued)

*Primary Examiner* — Jai M Lee
(74) *Attorney, Agent, or Firm* — Treyz Law Group, P.C.; Michael H. Lyons

(57) ABSTRACT

An electronic device may include an antenna that conveys wireless signals at frequencies greater than 100 GHz. The antenna may include a radiating element coupled to a uni-travelling-carrier photodiode (UTC PD). An optical path may illuminate the UTC PD using a first optical local oscillator (LO) signal and a second optical LO signal. An optical phase shift may be applied to the first optical LO signal. A Mach-Zehnder modulator (MZM) may be interposed on the optical path. During signal transmission, the MZM may modulate wireless data onto the second optical LO signal while control circuitry applies a first bias voltage to the UTC PD. During signal reception, the control circuitry may apply a second bias voltage to the UTC PD that configures the UTC PD to convert received wireless signals into intermediate frequency signals and/or optical signals.

20 Claims, 9 Drawing Sheets

(56) References Cited

OTHER PUBLICATIONS

Nagatsuma et al., High-Power RF Uni-Traveling-Carrier Photodiodes (UTC-PDs) and Their Applications, (Year: 2011).*

Zhang et al., Terahertz band: Lighting up next-generation wireless communications, China Communications, May 2021, pp. 153-174, vol. 18, No. 5, China Institute of Communications, Piscataway, NJ, USA.

Ducournau et al., THz Communications using Photonics and Electronic Devices: the Race to Data-Rate, Journal of Infrared, Millimeter, and Terahertz Waves, Oct. 2014, pp. 198-220, vol. 36, No. 2, Springer New York LLC.

Kanno et al., Coherent Terahertz Wireless Signal Transmission Using Advanced Optical Fiber Communication Technology, Journal of Infrared, Millimeter, and Terahertz Waves, Dec. 2014, pp. 180-197, vol. 36, No. 2, Springer New York LLC.

Seeds et al., TeraHertz Photonics 1-15 for Wireless Communications, Journal of Lightwave Technology, Feb. 2015, pp. 579-587, vol. 33, No. 3, IEEE, USA.

Dat et al., Transparent Fiber-Radio-Fiber Bridge at 101 GHz using Optical Modulator and Direct Photonic Down-Conversion, 2021 Optical Fiber Communications Conference and Exhibition (OFC), Jun. 2021, pp. 1-3, IEEE, USA.

Morohashi et al., Geneation of Coherent Terahertz Carriers in the 3 THz Range Using Optical-Comb-Based THz Source for Terahertz Communications, 2018 International Topical Meeting on Microwave Photonics (MWP), Oct. 2018, pp. 1-3, IEEE, USA.

S. Ummethala et al., Wireless Transmission at 0.3 THz Using Direct THz-to-Optical Conversion at the Receiver, 2018 European Conference on Optical Communication (ECOC), Sep. 2018, IEEE, New York, New York, United States.

Julian Webber et al., Terahertz Wireless CDMA Communication using Resonant Tunneling Diodes, 2019 IEEE Globecom Workshops (GC Wkshps), Dec. 2019, IEEE, New York, New York, United States.

Joseph C. Deroba et al., Tapered Multi-Beam Arrays via an Optically Power-Efficient Photonic Architecture, Journal of Lightwave Technology, Jun. 2018, pp. 2259-2270, vol. 36, No. 11, IEEE, New York, New York, United States.

Ming Che et al., Optoelectronic THz-Wave Beam Steering by Arrayed Photomixers With Integrated Antennas, IEEE Photonics Technology Letters, Aug. 2020, pp. 979-982, vol. 32, No. 16, IEEE, New York, New York, United States.

A.J. Seeds et al., New Applications for Microwave Photonics [Invited], Conference Proceedings—Lasers and Electro-Optics Society Annual Meeting—LEOS, Nov. 2009, pp. 701-702, IEEE, New York, New York, United States.

* cited by examiner

ELECTRONIC DEVICES WITH HIGH FREQUENCY WIRELESS COMMUNICATION CAPABILITIES

This application claims the benefit of U.S. Provisional Patent Application No. 62/235,423, filed Aug. 20, 2021, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, it can be difficult to implement wireless circuitry for handling high data rates in a resource-efficient and space-efficient manner.

SUMMARY

An electronic device may include wireless circuitry controlled by one or more processors. The wireless circuitry may include transceiver circuitry, one or more antennas, and one or more optical signal paths that couple the transceiver circuitry to each of the antennas. To support extremely high data rates, the antennas may convey wireless signals at frequencies greater than or equal to about 100 GHz. Each antenna may both transmit and receive the wireless signals using a time division duplexing scheme.

The antenna may include an antenna radiating element coupled to a programmable photodiode such as a uni-travelling-carrier photodiode (UTC PD). The optical signal path may illuminate the UTC PD using a first optical local oscillator (LO) signal and a second optical LO signal that is offset in wavelength with respect to the first optical LO signal. If desired, an optical phase shift may be applied to the first optical LO signal. This may allow for signal beam forming in implementations where the antenna is formed in a phased antenna array.

An optical modulator such as a Mach-Zehnder modulator (MZM) may be interposed on the optical path. A digital-to-analog converter (DAC) may be coupled to the MZM over a transmit path. During signal transmission, the DAC may output wireless data onto the transmit path. The MZM may modulate the wireless data onto the second optical LO signal. Control circuitry may apply a first bias voltage to the UTC PD that configures the UTC PD to convert the first optical LO signal and the modulated second optical LO signal into currents on the antenna radiating element at a frequency given by the difference in frequency between the first and second optical LO signals. The currents may be at frequencies greater than 100 GHz. The UTC PD may preserve the modulation in the second optical LO signal such that the currents on the antenna radiating element radiate wireless signals that include the wireless data output by the DAC.

During signal reception, the antenna radiating element receives wireless signals at frequencies greater than 100 GHz. The control circuitry may apply a second bias voltage to the UTC PD that configures the UTC PD to use the first and second optical LO signals to convert the wireless signals into intermediate frequency signals at lower frequencies than the wireless signals (e.g., at millimeter wave frequencies). A receive path may pass the intermediate frequency signals to the MZM for conversion to the optical domain or may pass the intermediate frequency signals to an analog-to-digital converter (ADC). In other implementations, the second bias voltage may configure the UTC PD to use the first and second optical LO signals to directly sample the received wireless signals into the optical domain. The control circuitry may recover wireless data from the intermediate frequency signals or the signals in the optical domain. In this way, the same antenna and optical signal path may be used to both transmit and receive signals at extremely high frequencies for supporting extremely high data rates while also supporting beam when implemented in a phased antenna array, thereby minimizing space and resource consumption within the device.

An aspect of the disclosure provides an electronic device. The electronic device can include a photodiode. The electronic device can include an optical signal path configured to illuminate the photodiode using a first optical local oscillator (LO) signal and a second optical LO signal that is offset in wavelength with respect to the first optical LO signal. The electronic device can include an optical modulator disposed along the optical signal path and configured to modulate wireless data onto the second optical LO signal. The electronic device can include an antenna radiating element coupled to the photodiode. The photodiode can be configured to generate, based on the first optical LO signal, the second optical LO signal, and a bias voltage applied to the photodiode, a current at a frequency greater than or equal to 100 GHz on the antenna radiating element, the current on the antenna radiating element being configured to radiate wireless signals that include the wireless data. The electronic device can include a receive path that couples the photodiode to the optical modulator.

An aspect of the disclosure provides an electronic device. The electronic device can include a photodiode. The electronic device can include an optical signal path configured to illuminate the photodiode using a first optical local oscillator (LO) signal and a second optical LO signal that is offset in wavelength with respect to the first optical LO signal. The electronic device can include an optical modulator disposed along the optical signal path. The electronic device can include a digital-to-analog converter (DAC) configured to output wireless data. The electronic device can include a transmit path that couples the DAC to the optical modulator and that is configured to convey the wireless data from the DAC to the optical modulator, the optical modulator being configured to modulate the wireless data onto the second optical LO signal. The electronic device can include an antenna radiating element coupled to the photodiode. The photodiode can be configured to generate, based on the first optical LO signal, the second optical LO signal, and a bias voltage applied to the photodiode, a current at a frequency greater than or equal to 100 GHz on the antenna radiating element, the current on the antenna radiating element being configured to transmit wireless signals that include the wireless data. The electronic device can include an analogto-digital converter (ADC). The electronic device can include a receive path that couples the photodiode to the ADC.

An aspect of the disclosure provides a method of operating an electronic device. The method can include, with optical components, generating a first optical local oscillator (LO) signal and a second optical LO signal that is offset in wavelength with respect to the first optical LO signal. The method can include, with a Mach-Zehnder modulator (MZM), modulating wireless data onto the second optical LO signal. The method can include, with a uni-travelling-carrier photodiode (UTC PD), converting the first optical LO signal and the second optical LO signal into a current at a frequency greater than 100 GHz on an antenna radiating element while the UTC PD is biased using a first bias voltage. The method can include, with the antenna radiating element, transmitting first wireless signals associated with the current, wherein the first wireless signals include the wireless data. The method can include, with the UTC PD, receiving second wireless signals at a frequency greater than 100 GHz using the antenna radiating element while the UTC PD is biased using a second bias voltage that is different from the first bias voltage.

DETAILED DESCRIPTION

Figure 1:
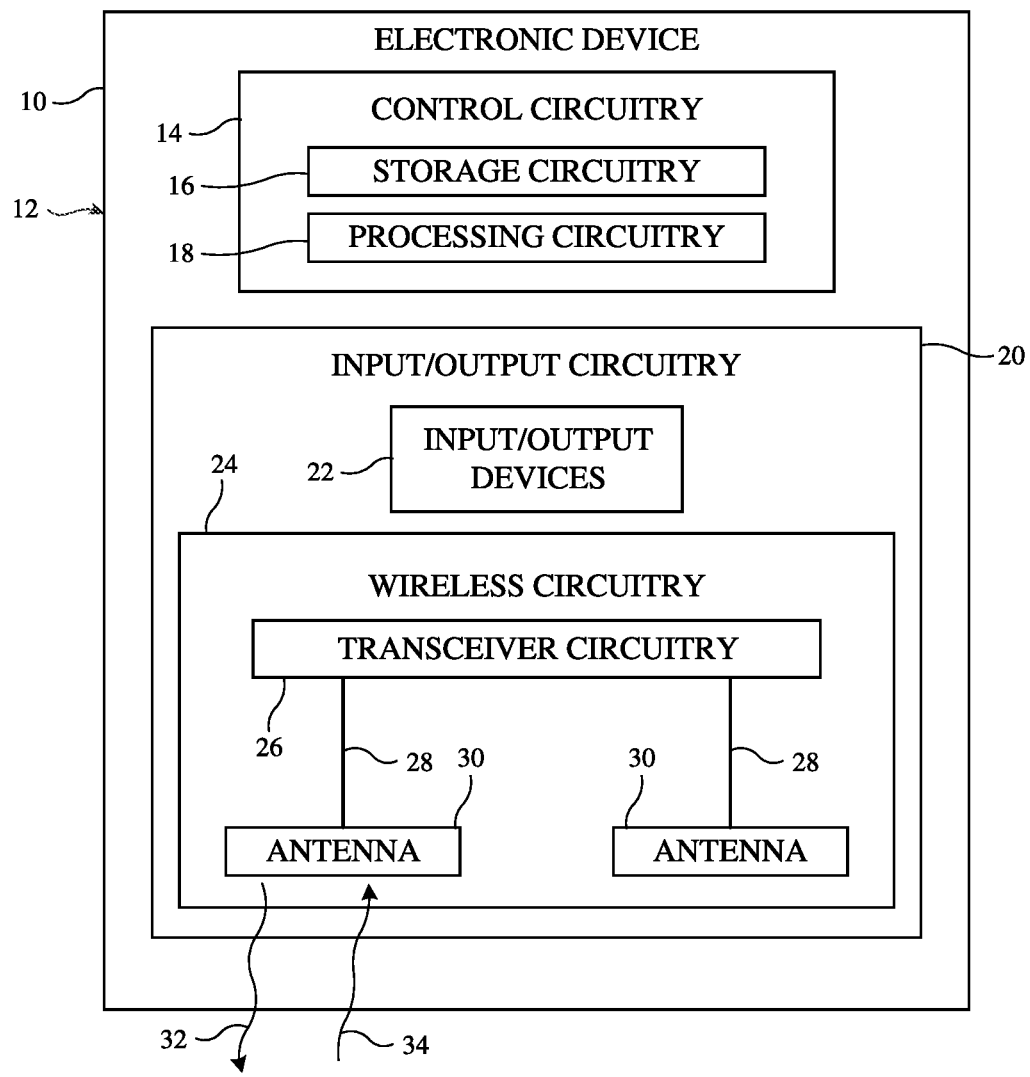
FIG. 1 is a block diagram of an illustrative electronic device having wireless circuitry with at least one antenna that both transmits and receives wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30. Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than 100 GHz.

As shown in FIG. 1, wireless circuitry 24 may transmit wireless signals 32 and may receive wireless signals 34 at frequencies greater than around 100 GHz. Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THF signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
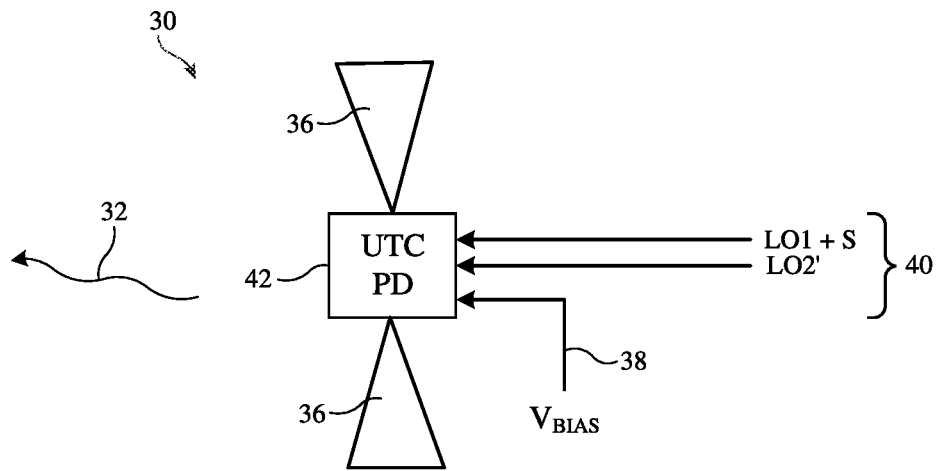
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 34 using optical signals. Antenna 30 may include one or more antenna radiating (resonating) elements such as radiating (resonating) element arms 36. In the example of FIG. 2, antenna 30 is a planar dipole antenna (sometimes referred to as a "bowtie" antenna) having two opposing radiating element arms 36 (e.g., bowtie arms or dipole arms). This is merely illustrative and, in general, antenna 30 may be any type of antenna having any desired antenna radiating element architecture.

As shown in FIG. 2, antenna 30 includes a photodiode (PD) 42 coupled between radiating element arms 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is merely illustrative and, in general, photodiode 42 may include any desired type of adjustable/programmable photodiode or component that converts electromagnetic energy at optical frequencies to current at THF frequencies on radiating element arms 36 and/or vice versa. Each radiating element arm 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal 38 that receives one or more bias voltages $V_{BIAS}$ (sometimes referred to herein as bias signals $V_{BIAS}$) Control circuitry 14 (FIG. 1) may provide (e.g., apply, supply, assert, etc.) bias voltage $V_{BIAS}$ with different magnitudes to dynamically control (e.g., program or adjust) the operation of UTC PD 42 over time. For example, bias voltage $V_{BIAS}$ may be used to control whether antenna 30 transmits THF signals 32 or receives THF signals 34. When bias voltage $V_{BIAS}$ is provided with (applied at) a first setting (e.g., a first magnitude or value), antenna 30 may be configured to transmit THF signals 32. When bias voltage $V_{BIAS}$ is provided with a second setting (e.g., a second magnitude or value), antenna 30 may be configured to receive THF signals 34. In the example of FIG. 2, bias voltage $V_{BIAS}$ is provided with the first setting to configure antenna 30 to transmit THF signals 32. If desired, bias voltage $V_{BIAS}$ may also be adjusted to control the waveform of the THF signals (e.g., as a squaring function that preserves the modulation of incident optical signals, a linear function, etc.) and/or to perform gain control on the signals conveyed by antenna 30.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of radiating element arms 36. The frequency of the antenna currents is equal to the frequency difference between local oscillator signal LO1 and modulated local oscillator signal LO2'. The antenna currents may radiate (transmit) THF signals 32 into free space. Bias voltage $V_{BIAS}$ may control UTC PD 42 to convert the optical local oscillator signals into antenna currents on radiating element arms 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
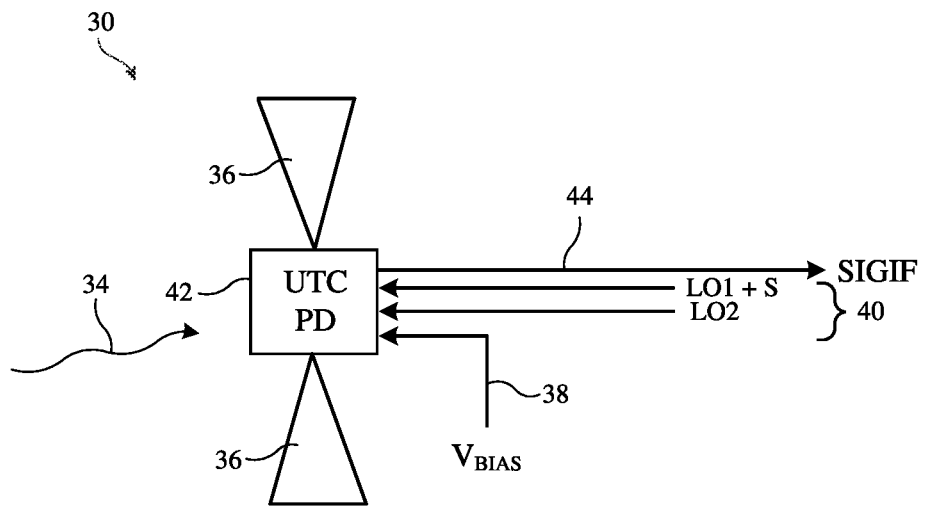
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 34 (e.g., after changing the setting of bias voltage $V_{BIAS}$ into a reception state from the transmission state of FIG. 2). As shown in FIG. 3, THF signals 34 may be incident upon antenna radiating element arms 36. The incident THF signals 34 may produce antenna currents that flow around the perimeter of radiating element arms 36. UTC PD 42 may use optical local oscillator signal LO1 (plus the optical phase shift S when applied), optical local oscillator signal LO2 (e.g., without modulation), and bias voltage $V_{BIAS}$ to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further downconversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
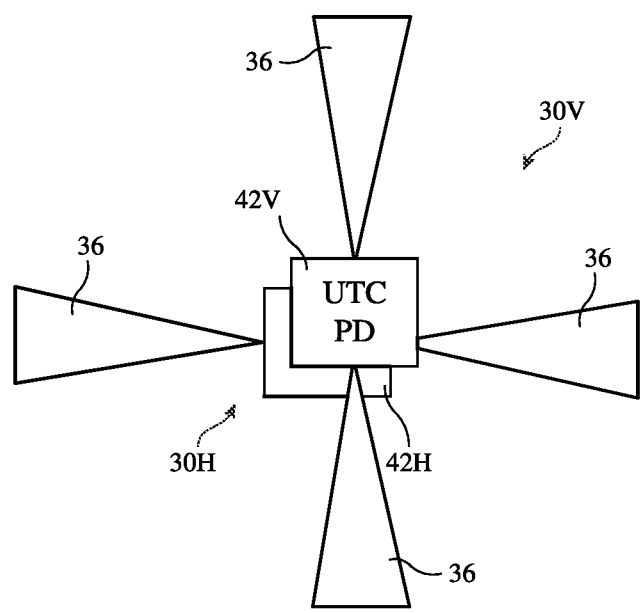
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms 36. Antenna 30H may have a UTC PD 42 such as UTC PD 42H coupled between a corresponding pair of radiating element arms 36 oriented non-parallel (e.g., orthogonal) to the radiating element arms 36 in antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The radiating element arms 36 in antenna 30V may be formed on a separate layer of the substrate than the radiating element arms 36 in antenna 30H or the radiating element arms 36 in antenna 30V may be formed on the same layer of the substrate as the radiating element arms 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the radiating element arms 36 in antenna 30V or may be formed on a separate layer of the substrate as the radiating element arms 36 in antenna 30V. UTC PD 42H may be formed on the same layer of the substrate as the radiating element arms 36 in antenna 30H or may be formed on a separate layer of the substrate as the radiating element arms 36 in antenna 30H.

Figure 5:
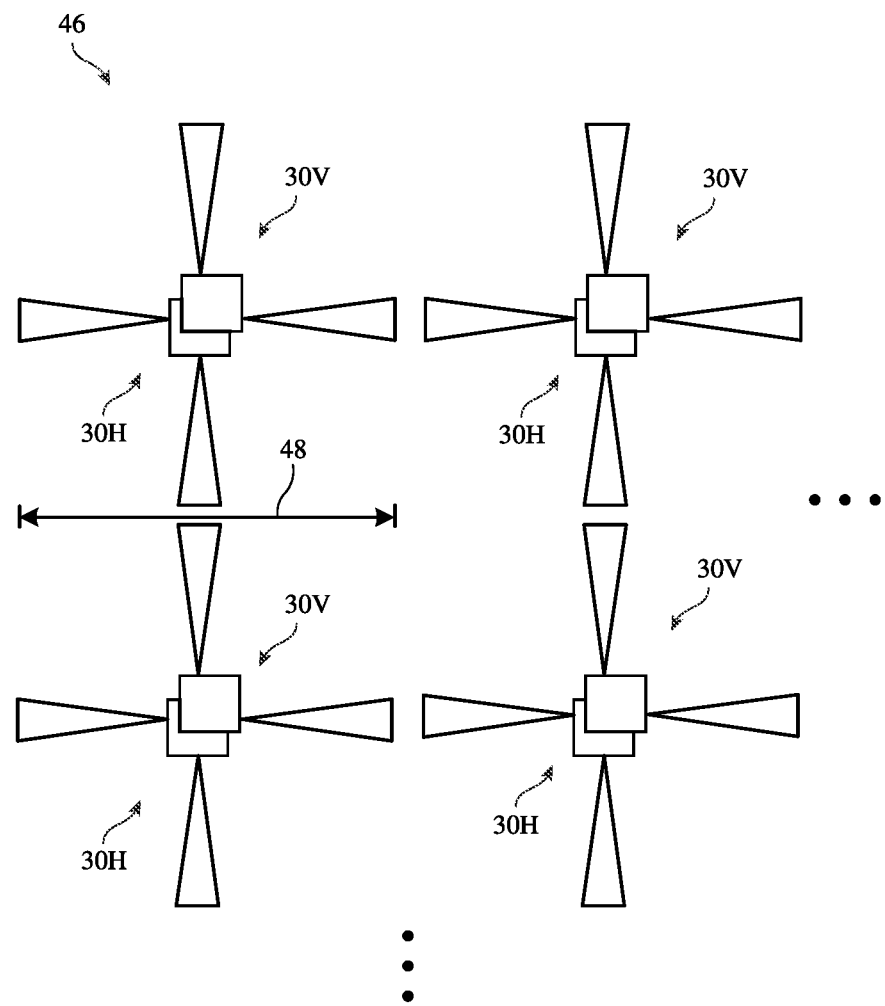
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is merely illustrative. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less. Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are merely illustrative and, in general, each antenna may have any desired antenna radiating element architecture.

Figure 6:
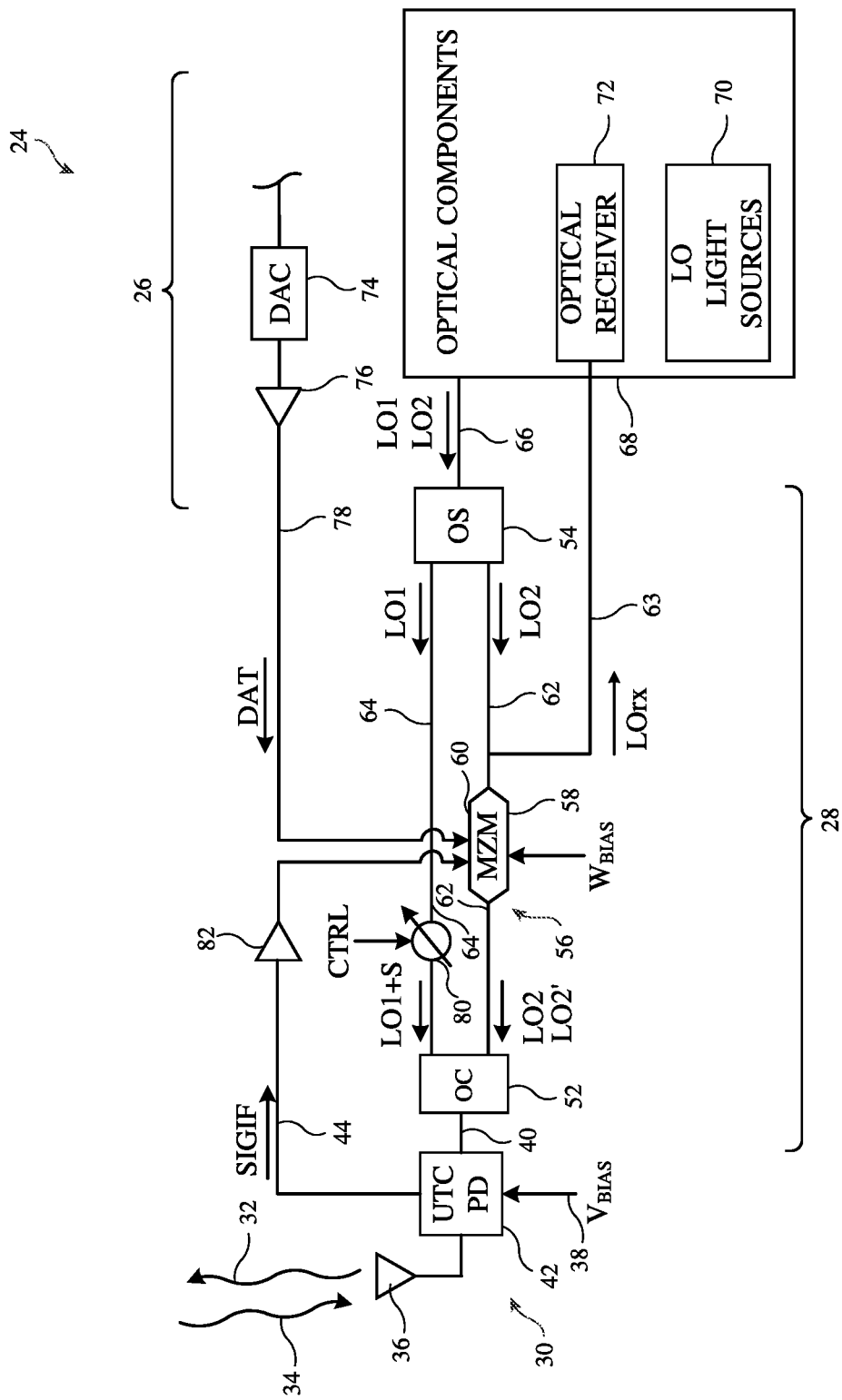
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources such as laser light sources, laser diodes, optical phase locked loops, or other optical emitters that emit light (e.g., optical local oscillator signals LO1 and LO2) at respective wavelengths. If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 82 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a bias voltage $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on radiating element arm(s) 36 at the frequency of THF signals 32 (e.g., while programmed for transmission using bias voltage $V_{BIAS}$) The antenna currents on radiating element arm(s) 36 may radiate THF signals 32. The frequency of THF signals 32 is given by the difference in frequency between optical local oscillator signal LO1 and modulated optical local oscillator signal LO2'. Bias voltage $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 34, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a bias voltage $V_{BIAS}$ to UTC PD 42 that configures antenna 30 for the receipt of THF signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 34. Low noise amplifier 82 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the corresponding optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

Figure 7:
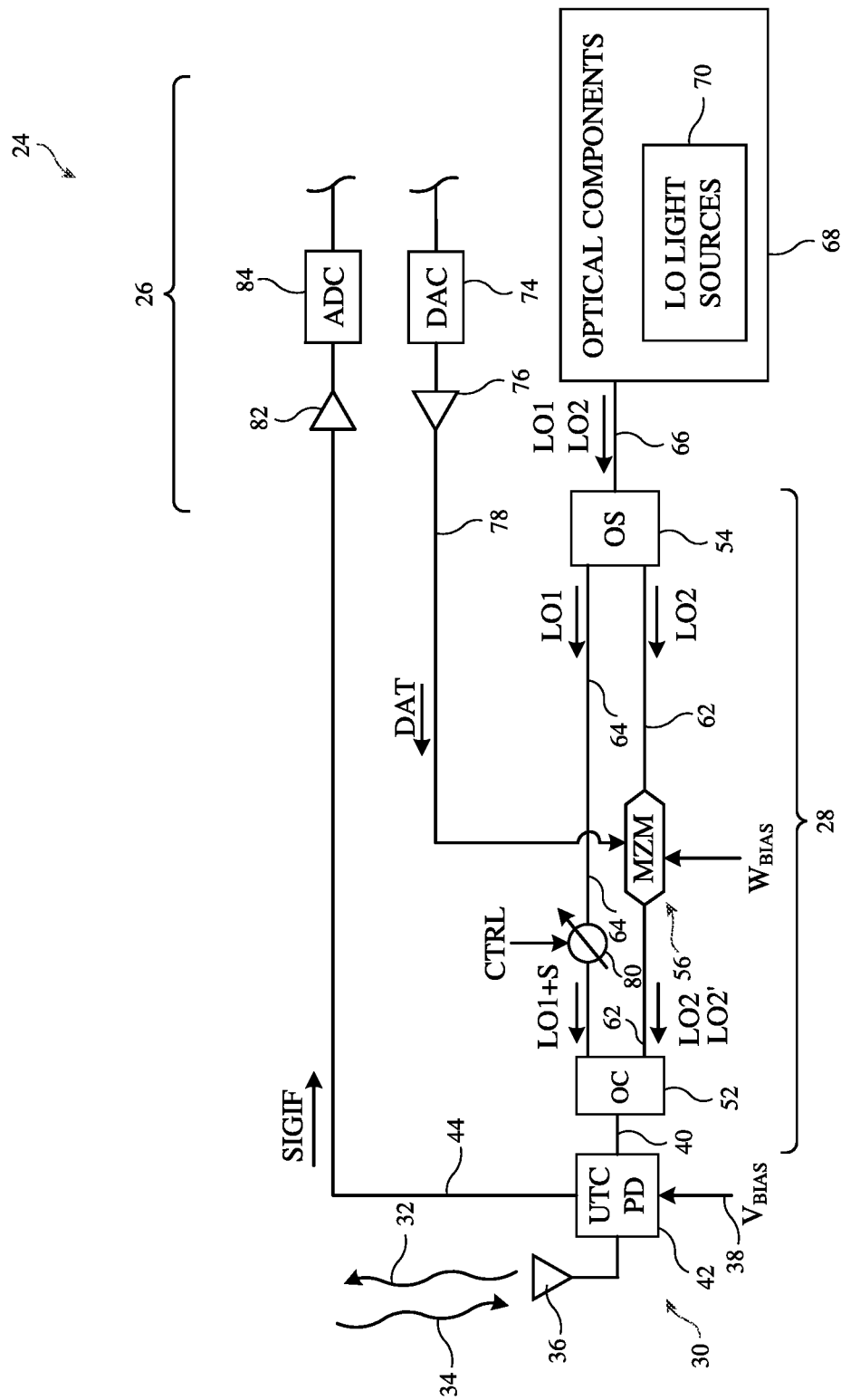
FIG. 7 is a circuit diagram of illustrative wireless circuitry having an antenna that transmits wireless signals at frequencies greater than about 100 GHz and that receives wireless signals at frequencies greater than about 100 GHz for conversion to intermediate frequencies in accordance with some embodiments.

The example of FIG. 6 in which intermediate frequency signals SIGIF are converted to the optical domain is merely illustrative. If desired, transceiver 26 may receive and demodulate intermediate frequency signals SIGIF without first passing the signals to the optical domain. FIG. 7 is a circuit diagram showing how transceiver 26 may receive and demodulate intermediate frequency signals SIGIF without first passing the signals to the optical domain. Transmission of THF signals 32 is the same in the implementation of FIG. 7 as in the implementation of FIG. 6.

As shown in FIG. 7, transceiver circuitry 26 may include an analog-to-digital converter (ADC) 84. Intermediate frequency signal path 44 may be coupled to the input of ADC 84 (rather than to MZM 56 as in the example of FIG. 6). The output of ADC 84 may be coupled to down-conversion circuitry, demodulator circuitry, and/or baseband circuitry in a receiver of transceiver circuitry 26. During signal reception, UTC PD 42 may pass the intermediate frequency signals SIGIF generated from THF signals 34 to ADC 84 via intermediate frequency signal path 44. ADC 84 may convert intermediate frequency signals SIGIF to the digital domain. Control circuitry 14 (FIG. 1) may process the digital signals to recover (demodulate) the data carried by THF signals 34. This may, for example, allow optical components 68 to be formed without optical receiver 72 of FIG. 6. Intermediate frequency signal path 44 may sometimes also be referred to herein as receiver path 44, receive path 44, or receiver signal path 44, and may include radio-frequency transmission line structures (e.g., microstrips, strip lines, coaxial cables, waveguides, coplanar waveguides, grounded coplanar waveguides, etc.) that convey radio-frequency signals at millimeter/centimeter wave frequencies.

Figure 8:
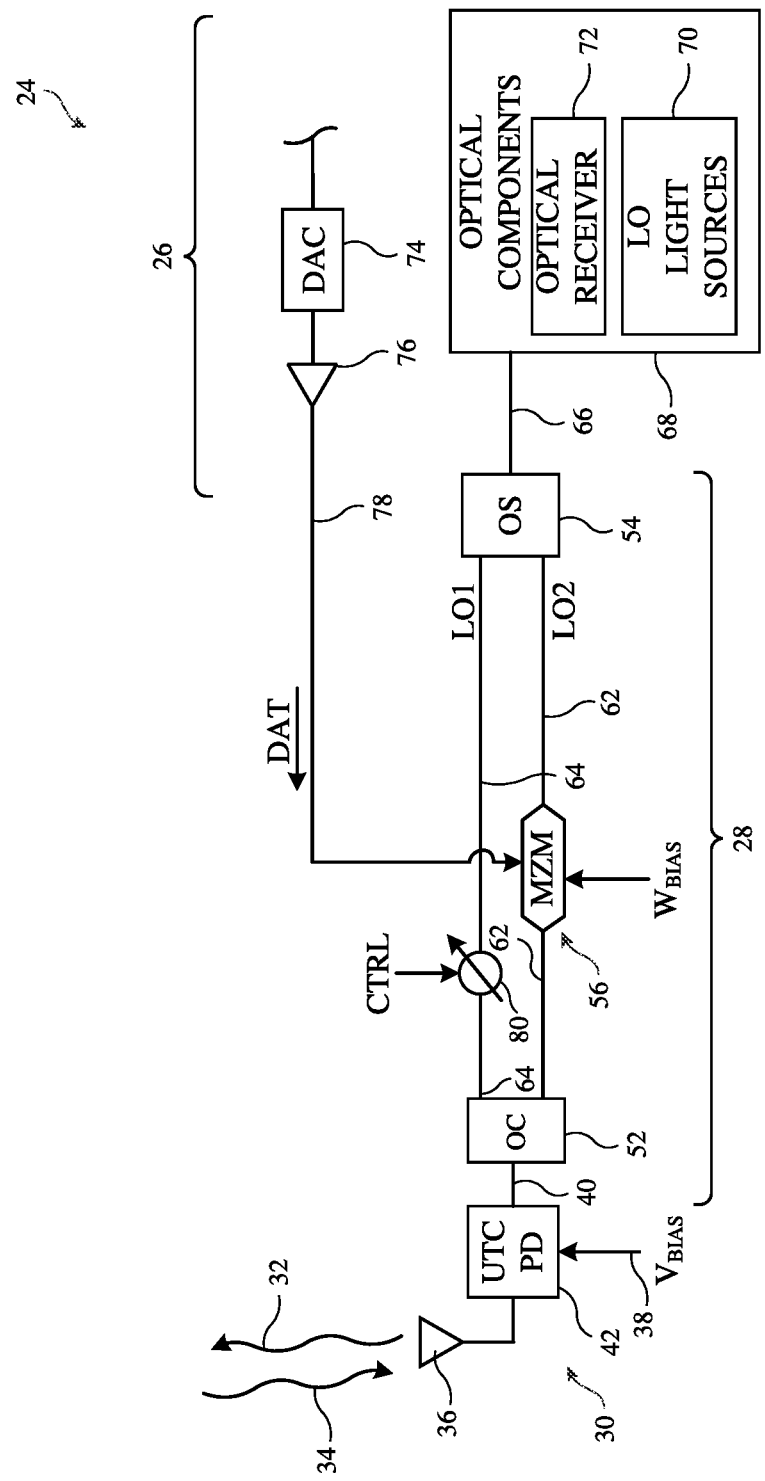
FIG. 8 is a circuit diagram of illustrative wireless circuitry having an antenna that transmits wireless signals at frequencies greater than about 100 GHz and that receives wireless signals at frequencies greater than about 100 GHz for direct sampling to the optical domain in accordance with some embodiments.

In yet another example, wireless circuitry 24 may directly sample the received THF signals 34 to the optical domain (e.g., without producing intermediate frequency signals SIGIF of FIGS. 6 and 7). FIG. 8 is a circuit diagram showing how wireless circuitry 24 may directly sample the received THF signals 34 to the optical domain. Transmission of THF signals 32 is the same in the implementation of FIG. 8 as in the implementations of FIGS. 6 and 7.

As shown in FIG. 8, intermediate frequency signal path 44 of FIGS. 6 and 7 may be omitted. Bias control voltage $V_{BIAS}$ may control UTC PD 42 to directly sample THF signals 34 with optical local oscillator signals LO1 and LO2 to the optical domain. As an example, UTC PD 42 may use the received THF signals 34 and bias voltage $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal).

Figure 9:
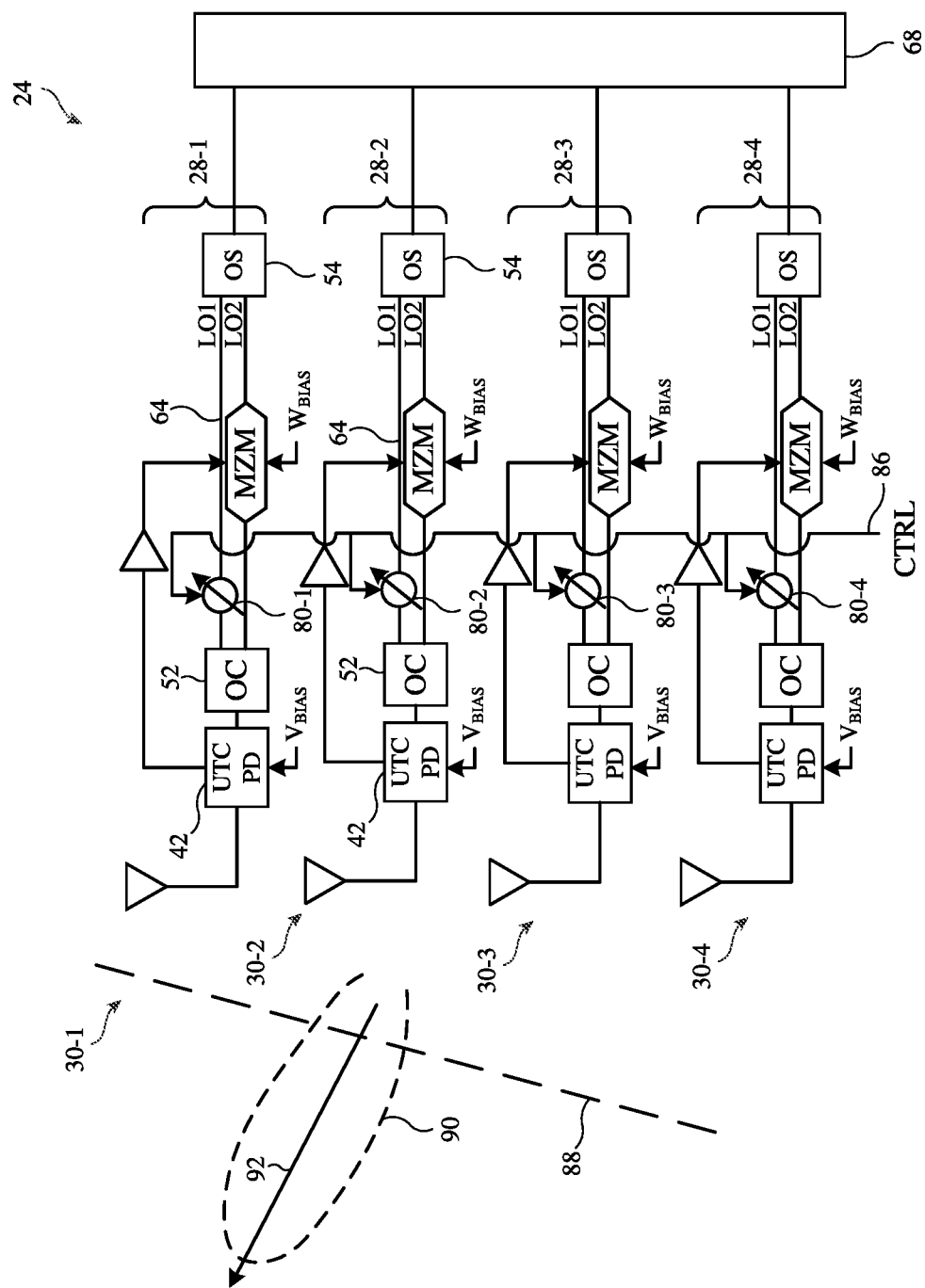
FIG. 9 is a circuit diagram of an illustrative phased antenna array that conveys wireless signals at frequencies greater than about 100 GHz within a corresponding signal beam in accordance with some embodiments.

FIG. 9 is a circuit diagram showing one example of how multiple antennas 30 may be integrated into a phased antenna array 46 that receives THF signals 34 over a corresponding signal beam. In the example of FIG. 9, phased antenna array 46 includes four antennas 30 such as antennas 30-1, 30-2, 30-3, and 30-4. This is merely illustrative and, in general, phased antenna array 46 may include any desired number of antennas. Each antenna is coupled to optical components 68 via a respective signal path 28 (e.g., antenna 30-1 is coupled to optical components 68 via signal path 28-1, antenna 30-2 is coupled to optical components 68 via signal path 28-2, antenna 30-3 is coupled to optical components 68 via signal path 28-3, etc.).

FIG. 9 only illustrates the components and operations of phased antenna array 46 involved in receiving THF signals 34. In general, phased antenna array 46 also includes data paths 78 and DACs 74 (FIGS. 6-8) for use by each antenna 30 in transmitting THF signals 32, but these elements have been omitted from FIG. 9 for the sake of clarity. Further, FIG. 9 illustrates one example where the UTC PD 42 for each antenna 30 converts received THF signals 32 to intermediate frequencies and then to the optical domain (e.g., as shown in FIG. 6). This is merely illustrative and, if desired, the UTC PDs 42 for each antenna 30 may convert received THF signals 32 to intermediate frequencies without converting to the optical domain (e.g., as shown in FIG. 7) or to the optical domain without converting to intermediate frequencies (e.g., as shown in FIG. 8).

As shown in FIG. 9, each signal path 28 receives optical local oscillator signals LO1 and LO2 from optical components 68. Each signal path 28 includes a respective optical phase shifter 80 interposed on the corresponding optical path 64 between the corresponding optical combiner 52 and the corresponding optical splitter 54 (e.g., signal path 28-1 may include optical phase shifter 80-1, signal path 28-2 may include optical phase shifter 80-2, signal path 28-3 may include optical phase shifter 80-3, etc.). Each optical phase shifter 80 may receive a control signal CTRL that controls the phase S provided to optical local oscillator signal LO1 by that optical phase shifter. By adjusting the phase S imparted by each optical phase shifter 80, control circuitry 14 (FIG. 1) may control each of the antennas 30 in phased antenna array 46 to receive THF signals 34 within a formed signal beam 90. Signal beam 90 may be oriented in a particular beam pointing direction (angle) 92 (e.g., the direction of peak gain of signal beam 90). The incoming THF signals 34 may have wavefronts 88 that are orthogonal to beam pointing direction 92. Control circuitry 14 may adjust beam pointing direction 92 over time to point towards external communications equipment or an external object or to point away from external objects, as examples. In this way, beam steering operations may be integrated into signal paths 28, each of which is used for both transmission and reception of THF signals that support extremely high data rates.

Figure 10:
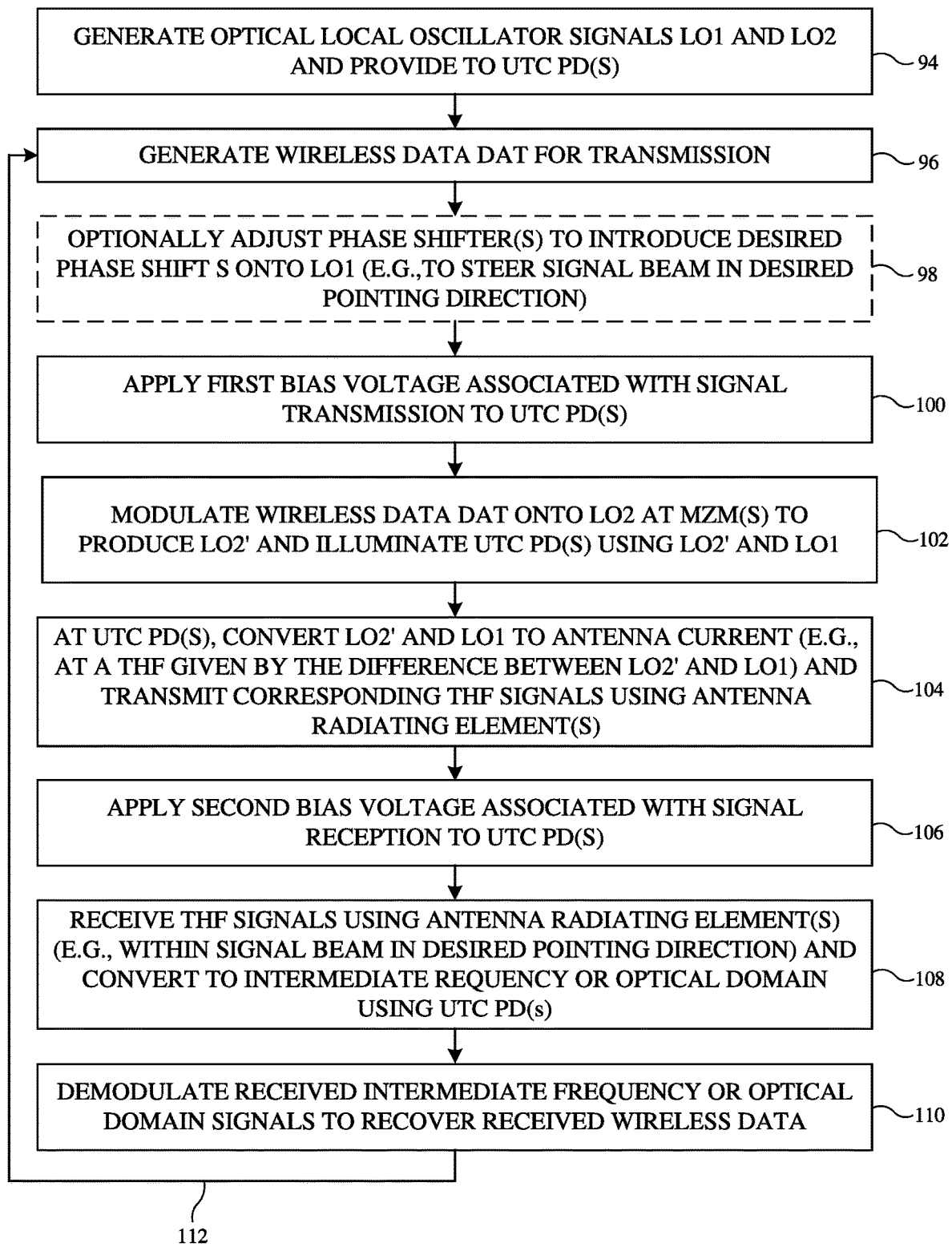
FIG. 10 is a flow chart of illustrative operations that may be performed by wireless circuitry to use the same antenna to both transmit and receive wireless signals at frequencies greater than 100 GHz in accordance with some embodiments.

FIG. 10 is a flow chart of operations that may be performed by wireless circuitry 24 in using one or more antennas 30 to both transmit and receive THF signals. At operation 94, LO light sources 70 may begin to generate optical local oscillator signals LO1 and LO2. Signal path(s) 28 may pass the optical local oscillator signals to UTC PD(s) 42.

When control circuitry 14 has wireless data to transmit to external communications equipment (e.g., at the high data rates supported by THF signals), processing may proceed to operation 96. At operation 96, DAC 74 may generate wireless data DAT for transmission.

At optional operation 98, control circuitry 14 may control optical phase shifter(s) 80 to apply a phase shift S onto optical local oscillator signal LO1. Phase shift S may be selected so that multiple antennas 30 produce a signal beam 90 oriented in a corresponding beam pointing direction 92 (FIG. 9). Operation 98 may be omitted if desired (e.g., in examples where only a single antenna 30 is transmitting signals or when beam steering is not performed).

At operation 100, control circuitry 14 may apply a first bias voltage $V_{BIAS}$ to UTC PD(s) 42. This configures the UTC PDs to transmit THF signals while preserving modulation from the modulated local oscillator.

At operation 102, MZM(s) 56 may modulate optical local oscillator signal LOC2 using wireless data DAT to generate (produce) modulated optical local oscillator signal LOC2'. Optical path(s) 40 may illuminate UTC PD(s) 42 using optical local oscillator signal LOC1 (e.g., as phase-shifted at operation 98) and modulated optical local oscillator signal LOC2'.

At operation 104, UTC PD(s) 42 may convert modulated optical local oscillator signal LO2' and optical local oscillator signal LO1 into THF signals 32 radiated into free space by radiating element arm(s) 36. For example, UTC PD(s) 42 may use the first bias voltage $V_{BIAS}$ to convert the difference between modulated optical local oscillator signal LOC2' and optical local oscillator signal LOC1 into antenna currents on radiating element arm(s) 36, which are radiated into free space as THF signals 32. The antenna currents and thus THF signals 32 may be at a frequency given by the difference in frequency between modulated optical local oscillator signal LOC2' and optical local oscillator signal LOC1. UTC-PD(s) 42 may preserve the modulation of modulated optical local oscillator signal LOC2 in the radiated THF signals 32, thereby allowing receipt and recovery of wireless data DAT at external communications equipment.

When UHF signals 34 carrying wireless data are incident upon antenna(s) 30, processing may proceed to operation 106. At operation 106, control circuitry 14 may apply a second bias voltage $V_{BIAS}$ to UTC PD(s) 42. This configures the UTC PDs to receive THF signals while preserving modulation from the THF signals.

At operation 108, the THF signals may produce antenna currents on radiating element arm(s) 36. UTC PD(s) 42 may use optical local oscillator signal LO1, (unmodulated) optical local oscillator signal LO2, and bias voltage $V_{BIAS}$ to convert the antenna currents into intermediate frequency signals SIGIF (e.g., in FIGS. 6 and 7) or to directly sample the antenna currents into the optical domain (e.g., in FIG. 8). The phase S of the first optical local oscillator signal LO1 may configure the antennas 30 in phased antenna array 46 to receive THF signals 34 within signal beam 90 oriented in a selected pointing direction 92.

At operation 110, a receiver in transceiver circuitry 26 may process the intermediate frequency signals SIGIF or the optical domain signals to demodulate and recover the wireless data in the received THF signals 34. Control circuitry 14 may pass the recovered wireless data up a protocol stack for further processing if desired. When control circuitry 14 has wireless data to transmit to external communications equipment, processing may loop back to operation 96 as shown by path 112. In this way, each antenna 30 in wireless circuitry 24 may both transmit THF signals 32 and may receive THF signals 34 in a time division duplexing arrangement, thereby minimizing resource and space consumption within device 10 relative to scenarios where separate antennas and signal paths are used for signal transmission and reception, while also allowing for precise beam forming and steering techniques to be implemented despite the high frequency of the THF signals.

The example of FIG. 10 is merely illustrative. Operations 96, 98, 100, 102, and/or 104 may be performed concurrently. Operations 106, 108, and/or 110 may be performed concurrently. Operations 106-110 may be performed prior to operations 96 and 100-102 if desired. Operation 98 may be performed whenever the signal beam is to be formed (steered) in a different beam pointing direction.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. The optical components described herein (e.g., MZM modulator(s), waveguide(s), phase shifter(s), UTC PD(s), etc.) may be implemented in plasmonics technology if desired.

The methods and operations described above in connection with FIGS. 1-10 (e.g., the operations of FIG. 10) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
   a photodiode;
   an optical signal path configured to illuminate the photodiode using a first optical local oscillator (LO) signal and a second optical LO signal that is offset in wavelength with respect to the first optical LO signal;
   an optical modulator disposed along the optical signal path and configured to modulate wireless data onto the second optical LO signal;
   an antenna radiating element coupled to the photodiode, wherein the photodiode is configured to generate, based on the first optical LO signal, the second optical LO signal, and a bias voltage applied to the photodiode, a current at a frequency greater than or equal to 100 GHz on the antenna radiating element, the current on the antenna radiating element being configured to radiate wireless signals that include the wireless data; and
   a receive path that couples the photodiode to the optical modulator.

2. The electronic device of claim 1, wherein the antenna radiating element is configured to receive additional wireless signals at a frequency greater than or equal to 100 GHz and the photodiode is configured to generate radio-frequency signals on the receive path at a frequency less than 100 GHz based on the additional wireless signals, the first optical LO signal, the second optical LO signal, and the bias voltage applied to the photodiode.

3. The electronic device of claim 2, further comprising:
   control circuitry configured to supply the bias voltage to the photodiode at a first magnitude when the photodiode generates the current on the antenna radiating element and configured to supply the bias voltage to the photodiode at a second magnitude that is different from the first magnitude when the photodiode generates the radio-frequency signals.

4. The electronic device of claim 2, wherein the receive path is configured to pass the radio-frequency signals to the optical modulator and the optical modulator is configured to convert additional wireless data in the radio-frequency signals to an optical domain.

5. The electronic device of claim 1, wherein the optical signal path comprises:
   an optical splitter;
   an optical combiner;
   a first optical fiber coupled between the optical splitter and the optical combiner; and
   a second optical fiber coupled between the optical splitter and the optical combiner in parallel with the first optical fiber, wherein the optical modulator is interposed along the second optical fiber.

6. The electronic device of claim 5, further comprising:
   a phased antenna array that includes the antenna radiating element, the phased antenna array being configured to form a signal beam at the frequency.

7. The electronic device of claim 6, further comprising:
   an optical phase shifter interposed along the first optical fiber and configured to apply an optical phase shift to the first optical LO signal; and
   control circuitry configured to adjust a direction of the signal beam by adjusting the optical phase shift applied by the optical phase shifter.

8. The electronic device of claim 6, further comprising: control circuitry, wherein the optical modulator is configured to apply an optical phase shift to the second optical LO signal and the control circuitry is configured to adjust a direction of the signal beam by adjusting the optical phase shift applied by the optical modulator to the second optical LO signal.

9. The electronic device of claim 1, further comprising:
   a digital-to-analog converter (DAC) that outputs the wireless data; and
   a transmit path that couples the DAC to the optical modulator and that conveys the wireless data from the DAC to the optical modulator.

10. The electronic device of claim 1, wherein the photodiode comprises a uni-travelling-carrier photodiode (UTC PD).

11. The electronic device of claim 1, wherein the optical modulator comprises a Mach-Zehnder modulator (MZM).

12. An electronic device comprising:
    a photodiode;
    an optical signal path configured to illuminate the photodiode using a first optical local oscillator (LO) signal and a second optical LO signal that is offset in wavelength with respect to the first optical LO signal;
    an optical modulator disposed along the optical signal path;
    a digital-to-analog converter (DAC) configured to output wireless data;
    a transmit path that couples the DAC to the optical modulator and that is configured to convey the wireless data from the DAC to the optical modulator, the optical modulator being configured to modulate the wireless data onto the second optical LO signal;
    an antenna radiating element coupled to the photodiode, wherein the photodiode is configured to generate, based on the first optical LO signal, the second optical LO signal, and a bias voltage applied to the photodiode, a current at a frequency greater than or equal to 100 GHz on the antenna radiating element, the current on the antenna radiating element being configured to transmit wireless signals that include the wireless data;
    an analog-to-digital converter (ADC); and
    a receive path that couples the photodiode to the ADC.

13. The electronic device of claim 12, wherein the antenna radiating element is configured to receive additional wireless signals at a frequency greater than or equal to 100 GHz and the photodiode is configured to generate radio-frequency signals on the receive path at a frequency less than 100 GHz based on the additional wireless signals, the first optical LO signal, the second optical LO signal, and the bias voltage applied to the photodiode, the ADC being configured to convert the radio-frequency signals to a digital domain, and the electronic device further comprising:
    control circuitry configured to supply the bias voltage to the photodiode at a first magnitude when the photodiode generates the current on the antenna radiating element and configured to supply the bias voltage to the photodiode at a second magnitude that is different from the first magnitude when the photodiode generates the radio-frequency signals.

14. The electronic device of claim 13, wherein the photodiode comprises a uni-travelling-carrier photodiode (UTC PD).

15. The electronic device of claim 13, wherein the optical modulator comprises a Mach-Zehnder modulator (MZM).

16. The electronic device of claim 13, further comprising:

a phased antenna array that includes the antenna radiating element, the phased antenna array being configured to form a signal beam at the frequency;

an optical phase shifter interposed along the optical signal path and configured to apply an optical phase shift to the first optical LO signal; and control circuitry configured to adjust a direction of the signal beam by adjusting the optical phase shift applied by the optical phase shifter.

17. A method of operating an electronic device comprising:

with optical components, generating a first optical local oscillator (LO) signal and a second optical LO signal that is offset in wavelength with respect to the first optical LO signal;

with a Mach-Zehnder modulator (MZM), modulating wireless data onto the second optical LO signal;

with a uni-travelling-carrier photodiode (UTC PD), converting the first optical LO signal and the second optical LO signal into a current at a frequency greater than 100 GHz on an antenna radiating element while the UTC PD is biased using a first bias voltage;

with the antenna radiating element, transmitting first wireless signals associated with the current, wherein the first wireless signals include the wireless data; and with the UTC PD, receiving second wireless signals at a frequency greater than 100 GHz using the antenna radiating element while the UTC PD is biased using a second bias voltage that is different from the first bias voltage.

18. The method of claim 17, further comprising:

with the UTC PD, converting the second wireless signals into radio-frequency signals at a frequency less than 100 GHz while the UTC PD is biased using the second bias voltage; and with the MZM, converting the radio-frequency signals into an optical domain.

19. The method of claim 17, further comprising:

with the UTC PD, converting the second wireless signals into radio-frequency signals at a frequency less than 100 GHz while the UTC PD is biased using the second bias voltage; and with an analog-to-digital converter (ADC), converting the radio-frequency signals into a digital domain.

20. The method of claim 17, further comprising:

with the UTC PD, directly sampling the second wireless signals into an optical domain while the UTC PD is biased using the second bias voltage.

* * * * *

UNITED STATES PATENT AND TRADEMARK OFFICE
CERTIFICATE OF CORRECTION

| | |
|---|---|
| PATENT NO. | : 11,923,901 B2 |
| APPLICATION NO. | : 17/834695 |
| DATED | : March 5, 2024 |
| INVENTOR(S) | : Zdravko Boos and Bertram R. Gunzelmann |

Page 1 of 1

It is certified that error appears in the above-identified patent and that said Letters Patent is hereby corrected as shown below:

On the Title Page

Left Column, Item (73), "Assignee: Appli Inc., Cupertino, CA (US)" should read -- Assignee: Apple Inc., Cupertino, CA (US) --

Signed and Sealed this
Seventeenth Day of September, 2024

Katherine Kelly Vidal
*Director of the United States Patent and Trademark Office*